United States Patent [19]

Bonalumi

[11] Patent Number: 5,092,189
[45] Date of Patent: Mar. 3, 1992

[54] MACHINE WITH AT LEAST TWO HIGH OPERATING FORCE WORKING SHAFTS

[76] Inventor: Luigi Bonalumi, Via Renato Cuttica, 52, 20025 Legnano, Milan, Italy

[21] Appl. No.: 436,456

[22] Filed: Nov. 14, 1989

[30] Foreign Application Priority Data

Nov. 24, 1988 [IT] Italy ............... 22723 A/88

[51] Int. Cl.⁵ ............... F16H 1/26; F16H 37/06; F16H 57/00
[52] U.S. Cl. ............... 74/410; 74/421 R; 74/665 N; 74/665 GA
[58] Field of Search ............... 366/83, 84, 85, 86; 74/392, 396, 397, 398, 399, 410, 413, 665 GA, 403, 401, 665 G, 665 L, 665 M, 665 N, 421 R; 72/429, 199; 29/115; 425/208, 209

[56] References Cited

U.S. PATENT DOCUMENTS

| | | | |
|---|---|---|---|
| 2,763,160 | 9/1956 | Buckendale | 74/399 X |
| 3,315,546 | 4/1967 | Fritsch | 74/410 X |
| 3,393,584 | 7/1968 | Cleff | 74/410 X |
| 3,824,875 | 7/1974 | Willert et al. | 74/410 X |
| 4,315,440 | 2/1982 | Chszaniecki | 74/410 X |
| 4,586,402 | 5/1986 | Schafer | 74/410 X |

Primary Examiner—Harvey C. Hornsby
Assistant Examiner—Scott J. Haugland
Attorney, Agent, or Firm—Steinberg & Raskin

[57] ABSTRACT

A machine with at least two working shafts, particularly a double-screw extruder machine, comprises associated with each shaft a gear rotated by a drive gear, coaxial to said shaft and gear by way of at least two idle gear wheels acting on said gear and disposed within the drive gear.

Each idle gear wheel rotates about a shaft supported by a support member which is advantageously mobile in a plane orthogonal to the axis of the shaft and is disposed about this latter; between the drive gear and idle gear wheels there is provided a floating gear to transmit the drive force of the drive gear to said idle gear wheels.

8 Claims, 2 Drawing Sheets

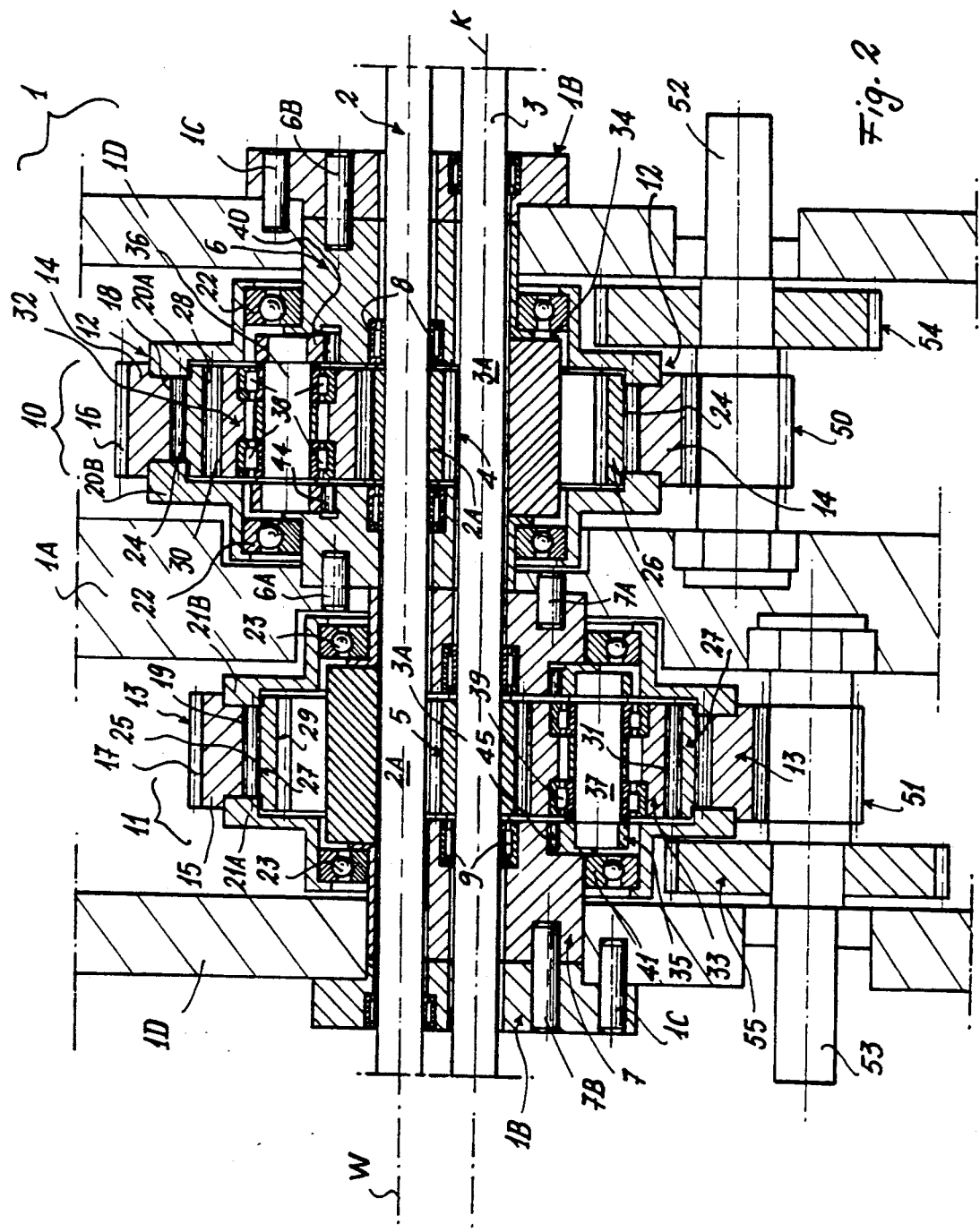

MACHINE WITH AT LEAST TWO HIGH OPERATING FORCE WORKING SHAFTS

BACKGROUND OF THE INVENTION

This invention relates to a machine with at least two working shafts, such as rolling mills or double-screw extruder machines. With particular reference to double-screw extruder machines, these generally comprise two shafts positioned a short distance from each other and each associated with an extrusion screw, and driven by the rotation transmitted to a gear associated with each shaft. The gear is located within fixed casing through which the shaft passes, rolling bearings being provided between said shaft and the fixed casing.

The problem with such machines is to make the extrusion screws exert high pressure on the material being worked. This is done by transmitting a high torques or power to it by the rotation of gears associated with the screw shafts.

In a known type of double-screw extruder machine, the gears associated with the screw shafts cooperate with each other.

However, because of the small distance between the axes of said shafts, it is not possible to design and construct gears able to generate high torques, such, for example, the torques required by known international standards of calculation.

Methods alternative to that stated have been proposed and implemented, however if on the one hand they enable the torque transferred to the shaft of each screw to be increased, on the other hand they lead to an increase in the machine dimensions and fracture of the toothed rims of said gears, or they result in an increase in the stresses in the bearings located between each shaft and said fixed box casing of the machine. Consequently, in these methods the limits on the torque (or power) transmitted to each shaft by the gear associated with it also depend on the mechanical characteristics of the bearings located between the shaft and the machine fixed casing, these bearings beyond a certain limit not being able to resist the stresses to which they are subjected, resulting in obvious difficulties.

SUMMARY OF THE INVENTION

An object of the present invention is therefore to provide a machine with at least two working shafts, and particularly a double-screw extruder machine, which is able to operate on the material with a high pressure which exceeds that obtainable in machines of the state of the art, without creating further problems in terms of the mechanical strength of the rolling contact bearings interposed between each shaft and the machine fixed casing.

A further object of the present invention is to provide a machine of the aforesaid type in which the unit which transmits movement to each shaft is of small dimensions.

These and further objects which will be apparent to the expert of the art are attained by a machine with at least two working shafts, particularly a double-screw extruder machine comprising a gear associated with each shaft, wherein each gear associated with the relative shaft is driven by a drive unit, each drive unit being disposed about the relative shaft, a free portion of the other shaft lying within said unit, each of said units comprising a drive gear coaxial to said relative shaft and operating on its associated gear by way of at least two idle gear wheels positioned within said drive gear and advantageously spaced equidistantly apart, said idle gear wheels being carried by a support member disposed about said relative shaft and advantageously mobile in any one of the planes orthogonal to the axis of this latter, there being provided between the drive gear and the idle gear wheels a floating gear arranged to transmit drive force from the drive gear to said idle gear wheels in a substantially uniform manner.

BRIEF DESCRIPTION OF THE DRAWINGS

The present invention will be more apparent from the accompanying drawing which is given by way of non-limiting example and in which:

FIG. 2 is a longitudinal sectional view through the machine according to the invention shown in FIG. 1.

DESCRIPTION OF THE PREFERRED EMBODIMENTS

Figure 1:
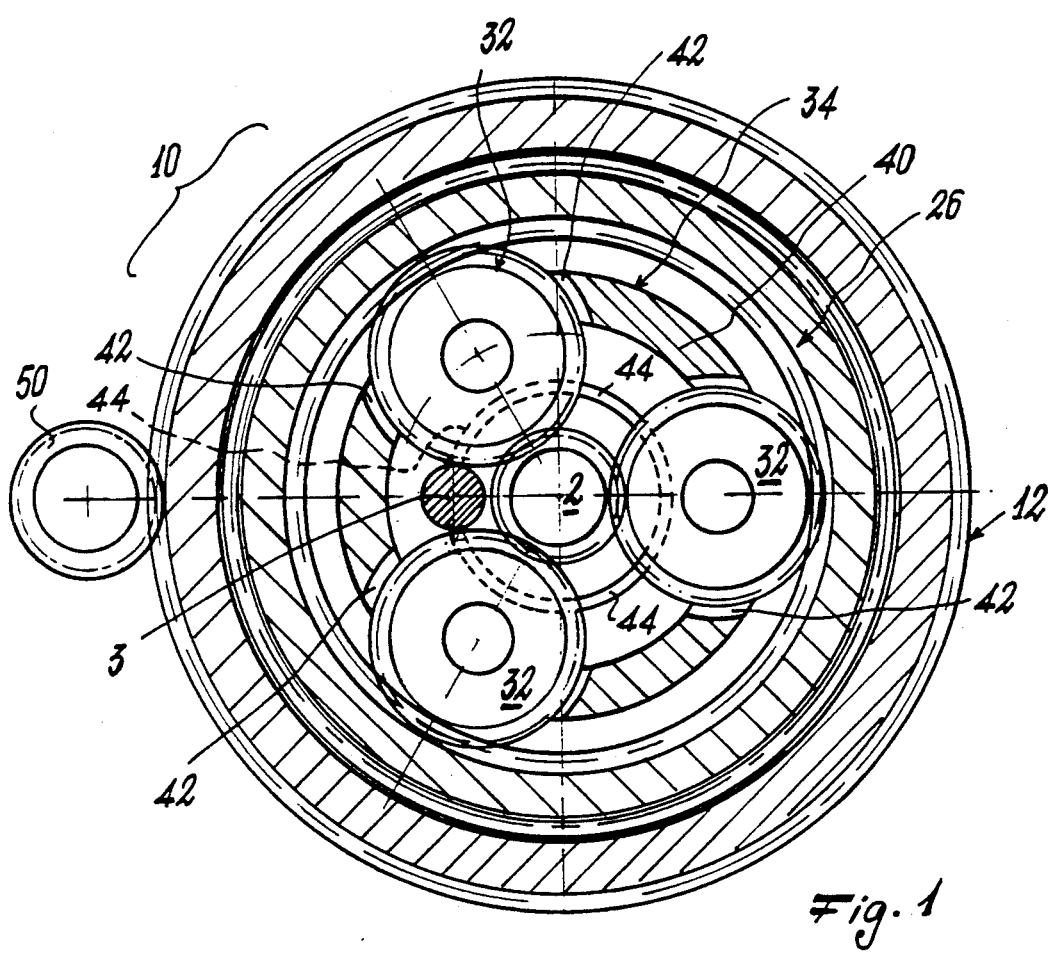
FIG. 1 is a cross-sectional view through the machine according to the invention with some parts omitted for greater clarity, and showing only a part of said machine.

With reference to the figures the machine according to the invention is indicated overall by the reference numeral 1 and comprises two shafts 2 and 3 disposed a short distance apart, and with which there are associated for example extrusion screws (not shown). With each shaft 2 and 3 there is associated a gear 4 and 5 respectively. The elements associated with each shaft are indicated hereinafter by even numbers if associated with the shaft 2 and odd numbers if associated with the shaft 3.

Each gear 4 and 5 is contained in a fixed box casing 6,7 secured by pins 6A, 7A to a frame portion 1A of the machine 1 and by pins 6B, 7B to closure plates 1B which are themselves secured by pins 1C to other frame portions 1D of the machine 1.

Between each shaft 2, 3 and each box casing 6, 7 there are disposed rolling-contact bearings, for example roller bearings 8 and 9, to allow the shafts 2 and 3 to rotate within their box casings.

With each gear 4 and 5 there is associated a drive unit 10, 11 disposed about both the shafts 2, 3 and containing a portion 2A and 3A of them. More specifically, the gear 4 is associated with the portion 2A present within the unit 10 and the gear 5 is associated with the portion 3A present within the unit 11.

These drive units 10 and 11 are composed of identical members and are disposed adjacent but offset to each other on the shafts 2 and 3. Hereinafter only one of the units, namely the unit 10, will be described using even reference numerals, the description of the other unit therefore being obtained by using for any member the next odd number to the even number used for the identical member in said unit 10.

The drive unit 10 (shown in FIG. 1) comprises an outer gear 12, called hereinafter the drive gear, consisting of a ring 14 with external toothing 16 and internal toothing 18 with respect to the shaft 2. Said ring 14 is supported in any known manner by a box structure composed of two parts 20A and 20B which are supported by the fixed box casing 6 by way of normal rolling-contact bearings, such as ball bearings 22.

The internal toothing 18 of said ring 14 cooperates with the external toothing 24 of a floating gear 26 also provided with internal toothing 28 which cooperates with the toothing 30 of idle gear wheels 32, of which three are shown disposed 120° apart.

These idle gear wheels 32 are supported by a member 34 which is advantageously mobile in any one of the planes orthogonal to the axis W of the shaft 2 and rotatable slightly around them (a few degrees). These idle gear wheels cooperate directly with the gear 4 associated with said shaft. In addition, the member 34 can also move in a plane containing said axis.

Specifically, each idle gear wheel 32 rotates about a shaft 36 fixed to the support member 34, rolling-contact bearings such as roller bearings 38 being provided between the shaft 36 and gear wheel 32, which cooperates by way of its toothing 30 with said gear 4.

The support member 34 comprises a body 40 (see FIG. 1) provided with apertures 42 which partially house the idle gear wheels 32, and with circular toothing 44. These toothing 44 cooperates with suitable seats provided in the box casing 6 (which seat are obviously provided with their own toothing or projections so that they may cooperate with toothing 44)to enable the member 34 to undergo said movements about the axis W of the shaft 2 (or of the member 35 about the axis K of the shaft 3), but prevents said member from rotating completely.

Finally, the machine 1 is provided with means for rotating the drive gear 12. These means can for example be a gear wheel 50 keyed onto a drive shaft 52 (as shown in FIG. 2), or the drive shaft 52 can be driven indirectly by a motion generator, the output of which is associated with the shaft 52 by way of a geared coupling 54.

FIG. 2 shows one drive shaft associated with each drive unit 10, 11. However a single drive shaft can be provided to drive both units 10, 11.

The drive unit 10 (and the drive unit 11) operates by transmitting motion from the drive shaft 52 through the gear wheel 50 to the drive gear 12. As it rotates, this gear engages the floating gear 26 which by moving within the unit 10 acts substantially uniformly on the idle gear wheels 32. In particular, the internal toothing 18 of the drive gear 12 and the external toothing 24 of the floating gear 26 are designed and constructed such that they engage perfectly, thus preventing any problems of seizing between their teeth or the like.

The idle gear wheels 32, rotated by the floating gear 26, act on the gear 4 associated with the shaft 2 and rotate it. As motion is transmitted to said gear 4 by the three idle gear wheels 32, the power or torque transmitted to the shaft 2 is high. In addition the particular spatial configuration of the three idle gear wheels 32 means that the resultant of the forces exerted on the gear 4 by said idle gear wheels is zero, with the result that there is no stressing of the bearings 8 interposed between the shaft 2 and the fixed box casing 6.

The idle gear wheels can also be two or greater than three in number. In this latter case, the bearings 8 may be subjected to a light load, however this would not influence their life to any great extent.

To obtain improved stress distribution in the idle gear wheels, the support member 34 for the idle gear wheels is able to move relative to the axis W of the shaft 2, this movement allowing better centering of the idle gear wheels within the drive unit 10. A machine constructed in accordance with the present invention allows extrusion screws (or any other working member associated with the shafts 2 and 3) to exert a considerable pressure on the material worked by the screws. This is obtained by increasing the number of members (idle gear wheels) engaging with the gears 4,5, which can thus transmit a considerable torque to the shafts 2,3 with which they are associated.

In addition, as the forces generated by the relative idle gear wheels 32,33 on each gear 4,5 have zero resultant, the bearings 8,9 disposed between the shafts 2,3 and the relative fixed box casings 6,7 are not stressed.

There is also no flexural deformation of the toothing of the gears 4 and 5 associated with the shafts 2 and 3 and no deformation of the shafts 3 and 4 themselves. This resultant could however be other than zero, for example if the idle gear wheels are not spaced equidistantly apart, however even in such a case the forces acting on the bearings 6,7 would not compromise their operation.

What I claim is:

1. A machine with at least two working shafts, said machine comprising:
    first and second working shafts;
    first and second gears respectively connected to said first and second working shafts;
    first and second drive units respectively driving said first and second gears with a free portion of said second shaft situated within said first drive unit and a free portion of said first shaft situated within said second drive unit;
    said first drive unit comprising a drive gear coaxial with said first shaft and comprising a support member disposed about said first shaft and movable in any direction perpendicular to the longitudinal axis of said first shaft, two idle gear wheels carried by said support member, and a floating gear disposed between said drive gear and said two idle gear wheels directly meshing with the drive gear and arranged to transmit drive force from said drive gear to said two idle gear wheels in a substantially uniform manner; and
    said second drive unit comprising a drive gear coaxial with said second shaft and comprising a support member disposed about said second shaft and movable in any direction perpendicular to the longitudinal axis of said second shaft, two idle gear wheels carried by said support member, and a floating gear disposed between said drive gear and said two idle gear wheels and arranged to transmit drive force from said drive gear to said two idle gear wheels in a substantially uniform manner.

2. A machine as claimed in claim 1, wherein each floating gear has internal toothing and each of said idle gear wheels has toothing which meshes with said internal toothing of one of said floating gears.

3. A machine as claimed in claim 1, further comprising a fixed box casing associated with each support member and wherein each support member carrying said idle gear wheels is supported by one of said fixed box casings of the machine.

4. A machine as claimed in claim 3, wherein each fixed boxed casing comprises a plurality of seats, each seat having respective toothing, and each support member comprises toothing arranged to mesh with said toothing of said seats in the fixed box casing in such a manner as to enable it to move about the axis of the relative shaft but prevent it from undergoing complete rotation.

5. A machine claimed in claim 1, wherein said support member disposed about said first shaft and said support member disposed about said second shaft have an aperture therein which partially encloses said two idle gear wheels carried by said support member, each idle gear wheel having a shaft securing it to the support member by which it is carried.

6. A machine as claimed in claim 1, further comprising a means for rotating each drive gear, said means for rotating comprising a gear wheel and a drive shaft to which said gear wheel is affixed.

7. The machine of claim 1, further comprising a respective fixed box casing and a respective rolling-contact bearing connected thereto for supporting each of said first and second shafts, each rolling-contact bearing being interposed between a respective fixed box casing and one of said first and second shafts, and each of said fixed box casings containing therein one of said first and second gears.

8. A machine as claimed in claim 7, wherein each drive gear comprises a ring supported by a box structure composed of two parts which are themselves supported by a said fixed box casing, said rings having internal toothing and the floating gear having external toothing, the internal toothing of said rings meshing with said external toothing of the floating gear.

* * * * *